United States Patent [19]
Ross

[11] 3,730,244
[45] May 1, 1973

[54] COMPRESSIBLE VEHICLE TIRE

[75] Inventor: William Campbell Ross, Winchester, Mass.

[73] Assignee: W. R. Grace & Co., Cambridge, Mass.

[22] Filed: May 11, 1971

[21] Appl. No.: 142,273

Related U.S. Application Data

[63] Continuation-in-part of Ser. No. 71,801, Sept. 14, 1970, which is a continuation-in-part of Ser. No. 725,577, April 17, 1968, Pat. No. 3,568,286, which is a continuation-in-part of Ser. No. 588,174, Oct. 20, 1966, abandoned.

[52] U.S. Cl.................................................152/323
[51] Int. Cl..............................................B60c 7/60
[58] Field of Search...................152/311, 312, 313, 152/314, 315, 316, 317, 318, 319, 320, 321, 322, 323

[56] References Cited

UNITED STATES PATENTS

| 1,349,914 | 8/1920 | Pratt | 152/323 |
| 1,523,043 | 1/1925 | Ukman | 152/318 |

Primary Examiner—James B. Marbert
Attorney—William L. Baker, C. E. Parker and Armand McMillan

[57] ABSTRACT

A compressible vehicle tire is disclosed wherein elastomer-coated filaments (e.g., synthetic rubber coated glass filaments) are wound on a core at an angle to the core and apart from one another and are joined at the cross-over points by the elastomer. The filaments are wound in such a manner that void spaces are defined by the filaments resulting in a porous, compressible structure. The outer surface may be covered with a layer of conventional tread compound.

12 Claims, 5 Drawing Figures

Patented May 1, 1973 3,730,244

COMPRESSIBLE VEHICLE TIRE

This application is a continuation-in-part of application, Ser. No. 71,801 filed Sept. 14, 1970, which is a continuation-in-part of application, Ser. No. 725,577 filed Apr. 17, 1968, now U.S. Pat. No. 3,568,286, which is a continuation-in-part of application, Ser. No. 588,174 filed Oct. 20, 1966, now abandoned.

This invention relates to a novel, resilient, volume-compressible filament-wound roll especially suitable for use as a vehicle tire.

The novel vehicle tire of the present invention comprises a porous layer of filamentary material as a compressible member wound on a substantially non-resilient core, e.g., a conventional automobile tire rim, and bonded at the crossover points by an elastomeric binder material which substantially covers the filamentary material. The filamentary material is wound at an angle to the axis of the core in such a manner as to provide a porous member comprising a network of voids between adjacent filaments. The filamentary material is wound in such a manner so that there is no contact between adjacent filaments in the same layer. The binder is subsequently cured which binds the crossover points of the filaments. The wound structure may be coated before or after the curing, with an abrasion-resistant polymeric coating such as any of the well-known rubber tread compounds followed by curing the tread compound and the binder on the filaments, if not already cured. Alternatively, the cured wound structure can be removed from the core, for instance, simply slipped off the mandrel, and inserted into a conventional vehicle tire carcass. As a load is exerted on the tire during operation, the elastomeric binder material will flow into the voids, and, as a result the tire will occupy a smaller space than it occupied under no load. The tire also possesses resistance to lateral distortion by virtue of the stabilization provided by the filamentary material. Thus the tire of the present invention is volume compressible because under a load it occupies a space smaller than that which it occupies with no load, is dimensionally stable, and has the very desirable characteristic of being blow out proof.

In order that the invention may be more clearly understood, it will be described in conjunction with the attached drawings in which.

Figure 1:
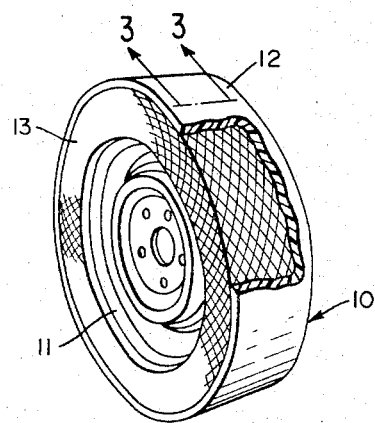
FIG. 1 is a diagrammatic view of the vehicle tire with a portion of the surface covering removed.

Referring now to the drawings, in FIG. 1, tire 10 is composed of a conventional automobile tire rim 11 upon which rubber coated fibers 13 are wound in a predetermined pattern. The surface is covered with tire tread compound 12.

Figure 2:
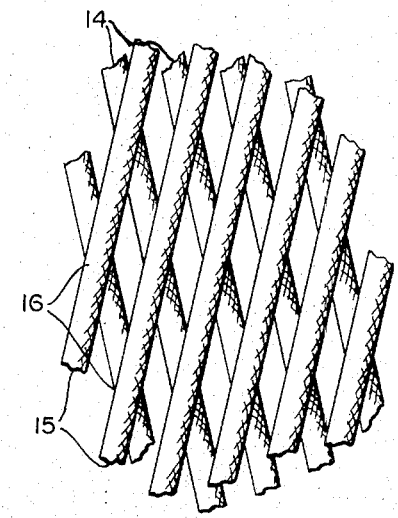
FIG. 2 is an enlarged diagrammatic view showing two layers of filament windings.

FIG. 2 is an enlarged diagrammatic view showing two layers of filament windings. Filaments 14 have been wound on the rim at an angle to the rim from right to left. Filaments 15 represent the next layer wound from left to right at the same angle as filaments 14. Filaments 14 and 15 are bonded at their crossover points 16 by the elastomeric material.

Figure 3:
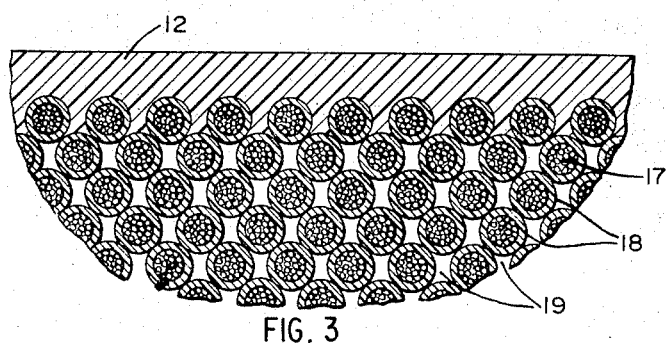
FIG. 3 is an enlarged diagrammatic side elevation of a cross section of the tire of FIG. 1 taken along lines 3—3.

FIG. 3 is an enlarged diagramatic cross section of a portion of tire 10 taken on lines 3—3. Underlying surface coating 12 is a plurality of layers of cords made up of individual filaments 17 which are surrounded with elastomeric binder material 18. The coated filaments define void areas 19 into which the lastomeric material flows upon compression.

Figure 4:
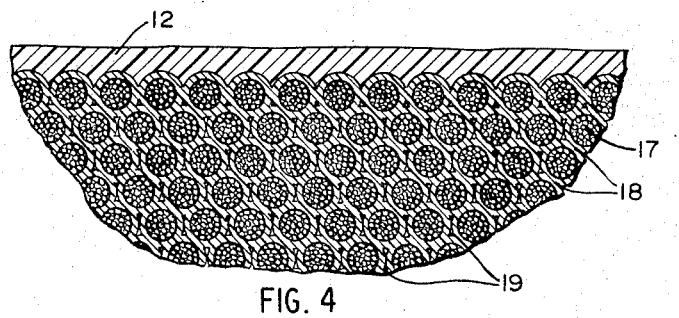
FIG. 4 is the cross section of FIG. 3 under compression.

FIG. 4 shows the cross section of FIG. 3 in its compressed state wherein the elastomeric material 22 has been forced to flow into voids 23.

Figure 5:
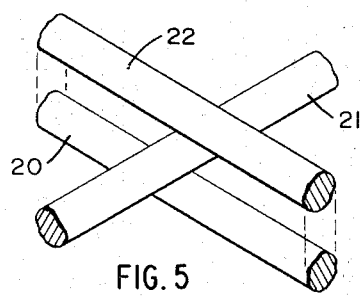
FIG. 5 is a schematic representation of a preferred embodiment of the tire showing the alignment of three successive layers of windings.

In FIG. 5, a first layer of filaments 20 is positioned beneath a next adjacent layer 21 and a third layer 22 is aligned over the first filament 20.

The tires are prepared by winding filamentary material in a predetermined pattern on a non-resilient core, e.g., a conventional vehicle tire rim. Each successive winding does not fall directly on the underlying parallel filament in the same layer; rather, it is displaced to provide the necessary void spaces and thus, adjacent filaments in the same layer do not contact each other. In one embodiment, the filament winding is started at one end of the core and wound at the desired angle across the core to the opposite end. The winding direction is then reversed and winding continued at the same angle back across the core making a criss-cross pattern with the underlayer. When the starting point is reached, the direction is again reversed, but care is taken to offset the upper layer of windings to avoid positioning it directly over the underlayer which is wound is the same direction. This procedure is continued until the desired number of windings is achieved.

Alternatively, one or more filaments may be applied to the core at the same time. For example, two filaments may be started, either at opposite ends of the core or at the center and wound on opposite directions at the same angle.

In one embodiment, the novel tires of the present invention are prepared by applying the elastomeric binder material to a filament, e.g., by passing the filament and the binder material through a nozzle and winding the resulting coated filament on a non-resilient core in the manner described above, spacing said filament to provide a predetermined amount of voids between the filaments. If desired, an adhesive is employed to secure the filaments to the core. Depending upon the binder material employed, a partial curing step for the binder material prior to the winding operation may be necessary in order to prevent the flow of the binder material into the voids as the roll is formed. After the winding of the filament is complete, curing of the binder is accomplished and, if desired a surface layer of a suitable surface coating material is applied.

Alternatively, uncoated filaments may be wound directly on a core in the manner described above. As the filaments are deposited upon the core and over the underlying layers of filaments, elastomeric binder material is applied, e.g., by spraying, to provide the filament coating and the binding action at the filament crossover points. In preparing tires according to this alternative embodiment, care must be taken to control the solids of the applied binder material and the speed at which the fibers are wound in order to prevent filling the void spaces with binder.

The void volume of the tires and the thickness of the filament layers may vary over a relatively wide range depending upon the particular properties desired in the tire.

The number of layers of filamentary material depends upon the pattern of windings employed, the diameter of the filament, the tension under which the filament is wound and the angle of the windings. The angle of winding preferably ranges from substantially perpendicular to the axis of the roll to an angle of 45° of the axis of the roll. The term "substantially perpendicular" as used herein is intended to refer to an angle deviating from a 90° angle to the axis of the tire and is intended to exclude a 90° angle. If the filaments were wound at an angle perpendicular to the axis of the tire, i.e., a 90° angle, then successive windings would lie directly on top of each other and the windings would not progress across the face of the tire. It is critical that the filaments be placed at such an angle so that there is no contact between adjacent filaments. The minimum angle, therefore, must be such that in one revolution of the tire, the filament advances along the roll a distance greater than the diameter of the coated filament. Thus the minimum void size is a function of the filament diameter. The specific angles selected are also dependent upon the circumference of the rim as well as the void volume desired. The closer the filaments are spaced to each other, the smaller the voids will be and the less the compression. In a preferred embodiment, the void volume is not less than 10 percent. However, a void volume of less than 10 percent may be employed for low compression operations. The upper limit of the void volume is determined by the unevenness of the pressure pattern which can be tolerated for the particular employment of the tire. When the fibers are wound in such a manner as to provide a relatively large void volume, the size of the thus-formed voids or gaps result in variations in compression across the area of the tire.

In an alternative embodiment, the filamentary material is wound at one angle for several layers and then the angle is changed. Thus a tire may comprise winding at different angles, but the angle change must not occur within a layer. The angle must remain constant throughout the layer.

In another embodiment shown in FIG. 5, the filamentary material is wound such that the filaments in a layer are aligned over the filaments in the preceding layer which have been wound in the same direction. Thus, a layer of filaments 20 is wound at an angle to the axis of the rim followed by a layer 21 wound in the opposite direction at an angle to the filaments of the first layer. The next layer 22 is then wound at the same angle to the axis of the rim as the first layer of windings which aligns the filaments substantially over the filaments in the first layer. Repeated winding of each successive layer in this fashion leads to a compressible porous portion exhibiting a multi-diamond configuration and is advantageous since the weight of the binder-coated filaments is distributed more uniformly over the body of the filament windings.

The volume of the elastomeric binder material on the filaments is preferably equal to the void volume. Preferably no more than an amount of binder material equal to the voids is employed. At least sufficient binder material should be present to permit flow of the binder into the voids thus obtaining the desired deflection in the tire. In a particularly preferred embodiment, at least about 75 percent by weight of elastomeric binder based on the weight of filament is employed.

Preferably an abrasion-resistant coating such as any of the well known tire tread compounds is applied to the surface of the tire. This coating protects the filaments from damage or wear. The particular surface coating may be selected depending upon the ultimate use of the tire and may be applied in several forms. As examples of suitable materials for the surface coatings, mention may be made of synthetic rubber compositions such as butadiene/acrylonitrile, butadiene/styrene and butadiene/styrene/acrylonitrile copolymers, vinyl polymers such as polyvinyl chloride and polyvinylidene chloride, epoxy resins and polyurethanes. The coatings may be applied from a solution or a latex by means of a tape or unsupported film or shrinkable film. The surface may comprise a tight winding of filaments across the entire face of the tire.

The terms "filament" and "filamentary material" as used herein are intended to refer to an individual continuous fiber, a plurality of fibers formed into a continuous strand, cords, yarns, and threads. Preferably, the filamentary material employed in the present invention comprises a strand which has been treated by means known to the art to minimize any abrasion on the strand during fabrication of the tire, e.g., by a polymeric coating such as polyvinyl chloride, plastisol or neoprene.

The filaments employed in the present invention include both natural and synthetic fibers such as glass, modacrylic (DYNEL), polyester (DACRON), polyethylene, polypropylene, polyvinylidene chloride, fluorocarbon, rayon, nylon, acrylic, cotton and wool. The particular fiber employed in the tire is selected with the end use of the tire in mind. For example, glass is the preferred filamentary material because of its substantially complete elastic recovery at substantially all loads and temperatures. Where relatively low loads are to be employed or if elastic recovery is not a major factor in the use of the tire, other materials may be employed. For example, DYNEL, which has 100 percent elastic recovery at 2 percent elongation could be selected for relatively low load operations.

In a particularly preferred embodiment, continuous filament glass yarn is employed. The continuous filament yarn is prepared by twisting and/or plying a number of Fiberglass fibers. A polymeric coating is applied to the yarn to make the glass non-friable.

Any elastomeric binder material is suitably for use in the present invention. As examples of such elastomers, mention may be made of synthetic rubbers such as nitrile rubber, neoprene, natural rubber and butadiene/styrene rubbers. The binders are preferably employed in the form of solvent solutions. However, aqueous latices are also employed to apply the elastomer to the filament. The binder can be coated on the filamentary material by passing the filament through a bath of binder solution or latex. Alternatively, the elastomeric binder can be applied by extruding a coating of the binder upon the filament using conventional extrusion techniques.

Small amounts of conventional additives, for example, vulcanizing agents, antioxidants, adhesion promoters, plasticizers, softeners, organic accelerators, etc. can be incorporated in the elastomeric binder.

The filament should be substantially covered by the binder or have a sufficient uniformity of pattern of deposited binder to give a uniform compression profile under load.

To provide, for example, extra cushion, the elastomeric binder material can be caused to foam utilizing conventional methods. Any of the well-known foaming agents such as 4,4' oxybisbenzenesulfonyl hydrazide, can be employed in the elastomeric binder to assure foaming of the elastomer. The extent to which the elastomer is foamed can be varied. For instance, foaming may be conducted to the extent that the spaces between the filaments in the wound tire are substantially filled with cellular elastomer, the filaments being connected by a network of elastomer-elastomer bonds. In such a case, the voids in the cellular elastomeric binder permit volume-compression of the material and the elastomer-elastomer bonds in the cellular network provide a high degree of cushion to the tire. Foaming to a lesser extent provides a tire wherein the spaces defined by the wound filaments are not entirely filled with wound cellular elastomer and the filaments are covered with a thin layer of the foamed elastomer which likewise provide cushion to the finished tire.

In another embodiment, instead of applying the filamentary material directly to a non-resilient core, an additional compressible material may be interposed between the core and between the porous layer of filamentary material. As an example of such material, mention may be made of polymeric sponge materials such as neoprene, urethane and natural rubber foams.

The cores on which the filaments are wound can be steel, rubber, plaster, etc. The filament wound structure can be employed with the core, e.g., vehicle tire rim, or the core removed after the filament winding step is complete. The cured elastomer-filament mass can simply be slipped off of the core, as mentioned above, an inserted into a conventional vehicle tire carcass or separated from the core by dissolving the core with a substance which is not a solvent for the filament or the elastomeric binder. A collapsible core can also be employed. The non-resilient core can be perforated to permit escape of air upon compression of the tire. In this manner the tire is cooled during high speed operation of the tire.

The following is a detailed example of one method of preparing the tires of the invention:

EXAMPLE

To a conventional 15 inch diameter automobile tire rim was applied Fiberglass yarn (E.C.G. 75/5/3) which had previously been coated with a GRS type synthetic rubber tire tread compound. The glass yarn was coated by passing the yarn through a laboratory Brabender extruder having a crosshead die. The temperature of the extruder was 200°F. The inside nozzle of the extruder had a diameter of 0.038 inch and the outside a diameter of 0.120 inch. Five pounds of rubber for each pound of glass yarn was applied.

The innermost recess of the rim was filled with rubber to provide a flat surface upon which to wind.

The coated yarn was then applied to the flat recess of the rim by winding the yarn circumferentially about the horizontal axis of the rim according to the manner of the invention using a McLean-Anderson Filament W-1 winding machine. A porous compressible body of successive layers of the coated, wound filament 3½ inches high was built-up on the rim. The coated filaments in each of the successive layers were spaced from one another and wound at an angle to the horizontal axis of the rim as shown in FIG. 6. The winding apparatus was pre-adjusted such that the angle of winding in any one layer of filaments was constant. A 1-inch wide ribbon of the tire tread compound, 1/16 of an inch in thickness, was then extruded over the surface of the windings until a ⅛ inch thickness was obtained to provide a covering after curing. The resulting product was then rotated in an oven for 6½ hours at 265°F. to cure the rubber and to provide a compressible product ideally suited for use as an automobile tire.

Since certain changes and modifications may be made in the above-described invention without departing from the scope of the invention, it is intended that all matter contained in the above description or shown in the accompanying drawing should be interpreted as illustrative and not in a limiting sense.

It is claimed:

1. A compressible vehicle tire comprising;
   a. a non-resilient, cylindrical vehicle tire rim adapted for attachment to said vehicle, said rim having a horizontal axis;
   b. an outer, abrasion-resistant, surface covering of a rubber tire tread compound; and
   c. intermediate of said rim and said surface covering, a compressible porous portion disposed on said rim, said porous portion comprising a plurality of layers of an elastomeric binder-coated filamentary material successively wound about said horizontal axis of said rim at an angle to said axis, the coated filaments in each wound layer being spaced from one another and adjacent layers of said filamentary material in said compressible porous portion being disposed at an angle to one another, the coated filaments in said adjacent layers being bonded to one another by said binder at the points where one filament crosses over another filament, said coated, wound, bonded filamentary material defining void spaces in said compressible porous portion.

2. The vehicle tire as defined in claim 1 wherein said filamentary material is glass yarn.

3. The vehicle tire as defined in claim 1 wherein said binder is a synthetic rubber.

4. The vehicle tire as defined in claim 1 wherein said outer covering is comprised of a GRS type synthetic rubber tire tread compound.

5. The vehicle tire of claim 1 wherein said coated, wound, bonded filaments are in contact only at said crossover points.

6. The vehicle tire as defined in claim 1 wherein said filamentary material is wound on said core at an angle between substantially perpendicular and 45° to said axis.

7. The vehicle tire as defined in claim 1 wherein at least about 75 percent by weight, based on the weight of said filamentary material, of said binder is employed.

8. The vehicle tire as defined in claim 1 wherein the void volume of said compressible porous portion is not less than 10 percent.

9. A compressible vehicle tire comprising;
 a. a non-resilient, cylindrical vehicle tire rim adapted for attachment to said vehicle, said rim having a horizontal axis;
 b. an outer, abrasion-resistant surface covering of a rubber tire tread compound; and
 c. intermediate of said rim and said surface covering, a compressible porous portion disposed on said rim, said porous portion comprising a plurality of layers of an elastomeric binder-coated filamentary material successively wound about said horizontal axis of said rim at an angle to said axis, the coated filaments in each of said wound layers being spaced from one another and disposed at a constant angle to said axis, the coated filaments in a layer of said filamentary material being at an angle to the filaments in an adjacent layer and further being bonded to one another by said binder at the points where one filament crosses over another filament, said coated, wound, bonded filamentary material defining void spaces in said compressible porous portion.

10. The vehicle tire as defined in claim 9 wherein said elastomeric binder is a cured synthetic rubber.

11. A compressible vehicle tire comprising;
 a. a non-resilient, cylindrical vehicle tire rim adapted for attachment to said vehicle, said rim having a horizontal axis;
 b. an outer abrasion-resistant, surface covering of a butadiene-styrene copolymer-containing composition; and
 c. intermediate of said rim and said surface covering, a compressible porous portion disposed on said rim, said porous portion comprising a plurality of layers of an elastomeric binder-coated filamentary material successively wound about said horizontal axis of said rim at an angle to said axis, the coated filaments in each of said wound layers being spaced from one another and disposed at a constant angle to said axis, the coated filaments in a layer of said filamentary material being at an angle to the filaments in an adjacent layer and bonded thereto by said binder at the points where one filament crosses over another filament and further the filaments in a layer being disposed at the same angle to said axis as the filaments in an alternate layer and thereby aligned over said filaments in said alternate layer, said coated, wound, bonded filamentary material defining void spaces in said compressible porous portion.

12. The vehicle tire as defined in claim 11 wherein said elastomeric binder is a synthetic rubber composition containing a butadiene-styrene copolymer.

* * * * *